Figure 1:
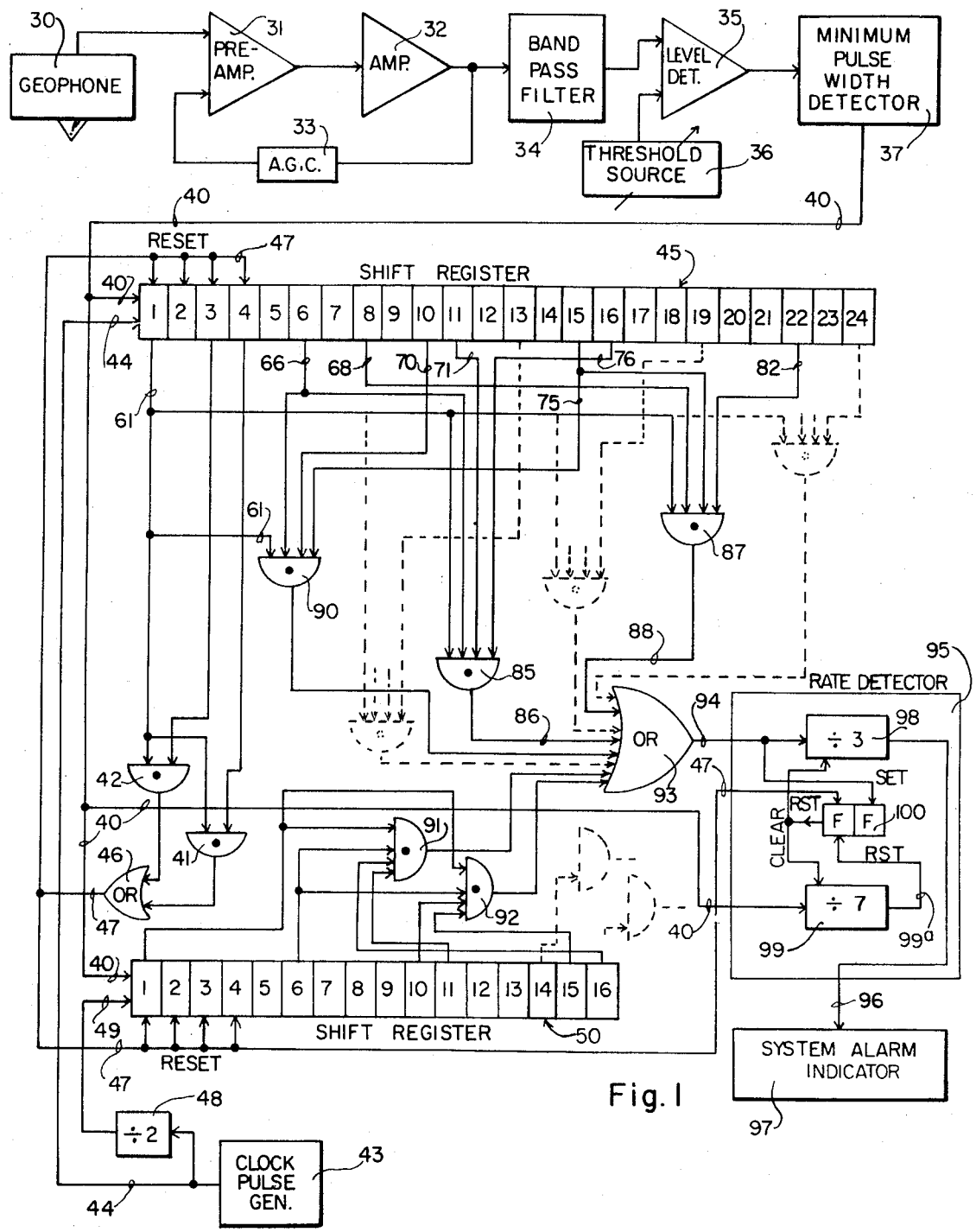

United States Patent [19]
Cook et al.

[11] 3,717,864
[45] Feb. 20, 1973

[54] PERIODIC EVENT DETECTOR SYSTEM
[75] Inventors: John C. Cook, Dallas; M. Duane Wilt, Quinlan, both of Tex.
[73] Assignee: Teledyne Industries, Inc.
[22] Filed: Nov. 2, 1971
[21] Appl. No.: 194,812

[52] U.S. Cl........340/261, 340/258 D, 340/15.5 DP, 340/258 R
[51] Int. Cl..............................................G08b 13/00
[58] Field of Search......340/261, 258 D, 258 R, 15.5 DP, 340/15.5 AP; 181/.5 EC, .5 NP

[56] References Cited
UNITED STATES PATENTS
3,307,168  2/1967  Zaleski............................340/258 R
3,665,445  5/1972  Riley, Jr..............................340/261

Primary Examiner—John W. Caldwell
Assistant Examiner—Michael Slobasky
Attorney—Arthur E. Dowell, Jr. et al.

[57] ABSTRACT

An intrusion detector system for detecting periodic events such as footsteps in the illustrative example, such events being picked up by a vibration transducer and being distinguished from other random vibration events by virtue of their regular periodicity, the system using ordinary frequency and amplitude techniques in early stages to eliminate undesirable vibrational waves or "signatures" which are probably not attributable to footstep events, and then using digital filtering techniques to detect significant periodicity among the filtered event signals remaining. The system uses the latter techniques to clock such event signals comprising discrete energy bursts through long shift registers at clock rates which are high as compared with the rate of occurrence of the events, and then employs many different groups of sampling gates to examine differently spaced stages in the shift registers to test for different periodicities. The system further compares periodicity determinations made in this way using digital techniques with characteristics of the incoming event signals themselves to ascertain whether at any particular time the number of event signals which actually result in detections of periodicities is reliably high.

12 Claims, 2 Drawing Figures

PERIODIC EVENT DETECTOR SYSTEM

This invention relates to intrusion detector systems for detecting periodic events such as footsteps in the presence of other random events, and more particularly relates to improvements in detector systems employing digital techniques to discriminate between events of interest and other ambient events.

In the intrusion detector art, vibrational waveforms attributable to both cultural man-made events as well as non-cultural events are often referred to as "signatures," and, in general, intrusion detectors seek to identify and respond to certain types of cultural signatures while discriminating against and ignoring other types of cultural and non-cultural signatures which are of lesser interest and constitute an annoyance, since, to the extent that they can not be entirely eliminated, they initiate false alarms at the output of the detector system.

It is a major object of this invention to provide an intrusion detector system capable of recognizing footsteps in the presence of other vibrational events using digital filtering techniques to detect the periodicity of footsteps while rejecting other signatures having lesser degrees of periodicity in order to minimize the false alarm rate. Each footstep event as picked up by a geophone has a signature in the form of a damped wavetrain envelop, and these events are usually evenly spaced and periodically recurring, approximately at the rate of one to two-and-one-half events per second.

Another major object of the invention is to provide a detector system sensitive to a series of events which are in fact periodic as determined by multi-channel digital filter means. Since, within the range of footstep rates with which this system is especially concerned the rate may vary considerably, and since the precise rate of the footsteps is itself of no interest, the present system employs an over-all filter system which is broadband in the sense that it can respond to a wide range of event occurrence rates, but which filter system comprises many periodicity detecting channels each having a narrow bandwidth. An alarm condition results whenever the periodicity of events falls within the bandwidth of any one of these various channels. The geophone enters event signals which it picks up into shift register means, and locally generated clock pulses then shift the events along the register means until they are lost at the last register stage. The narrow bandwidth channels each comprise a group of sampling gates attached to periodically spaced stages of the register means. The clock rate is selected high as compared with the anticipated footstep rate so as to provide the filter with a high Q.

It is another object of the invention to provide a number of channels each comprising a group of sampling gates in which the gates do not have their inputs coupled to shift register stages which are precisely evenly spaced. Although the clock rate at which events are shifted through the stages is chosen high, it is still possible to have truly periodic events arriving which have a periodicity rate falling between multiples or sub-multiples of the clock rate and which might therefore escape detection by groups of gates which were connected to evenly spaced shift register stages. Therefore certain groups of gates have their inputs staggered from uniform shift register stage-spacings to increase the coverage of the filter to include these events.

It is another major object of this invention to provide means for reducing the sensitivity of the system to events which are not of interest from the point of view of intrusion detection, whether these events are man-made or non-cultural in nature, such techniques including automatic gain control amplification, bandpass frequency filtering, and threshold detection means for the elimination of filtered signals whose amplitude is less than a predetermined level. The frequency responsive means of the input filter in one manufactured embodiment of the invention has passband extending from about 1 Hertz to 6Hertz in width, the lower cutoff frequency serving to eliminate undesirable spurious events such as might be caused by DC drift in the input amplifiers, and the upper roll-off frequency of 6 Hertz serving to eliminate frequencies lying above and outside of the main frequency spectrum resulting from footsteps.

It is another object of the invention to provide means for eliminating types of signals which might cause false alarms by blocking pulses which are too narrow in width to have occurred as a result of footsteps. For instance, the passage of heavy machines such as vehicles causes waveform signatures which when detected include pulses which are substantially narrower in width than the detected impulses comprising components of footstep signatures. For the purpose of eliminating such undesired narrow pulses the present system includes a minimum pulse-width detector which requires that any pulse to be passed from the geophone to the digital filtering system must be at least 80 milliseconds in width or else it is eliminated.

Another important object of the invention is to provide a system which requires the recurrence of a certain number of footstep signatures without drop-outs and all having a common periodic spacing. Early in the development of the present invention one of the embodiments of the system looked for footsteps occurring in pairs and then required a certain number of pairs to occur within a predetermined interval of time, after which time the system was reset. This type of digital filtering was very sensitive to brief successions of footsteps such as might occur if a person were sneaking through an area and pausing every several footsteps to listen. However, it was found that a great many natural events occur in pairs and that with a system of this type the false alarm rate tended to be too serious a problem. The present embodiment of the invention therefore provides a system in which a substantial number of footsteps must occur, all of which have the same periodicity and all of the steps occurring without a drop-out. The present illustrative embodiment requires four such events to occur, although a different number of events is within the contemplation of the inventive concept. For this purpose, an end-off shift register system is used in which clock pulses pass the events down through the many stages of the shift register, and then groups of gates connected with different spacings to the various stages of the shift register detect the passage of events having periodic spacings in real time. All of the groups of gates are connected through an OR gate to an output system so that if any one group of gates detects four unbroken periodic events the system can deliver an alarm signal. The clock rate selected is 10.5 Hertz which is about 4 to 11 times the rate at which footsteps are expected to occur in the normal course of events.

It is another important object of the invention to provide a detection system having two different shift registers, both serving as filters as described above, and in which two different clock pulse rates are employed, one rate being substantially higher than the other in order to provide one digital filter with a substantially higher Q than the other. If only a single shift register and clock rate were used in the digital filter system, the result would be that the Q of the filter would be enhanced for lower footstep rates which would be backwards from the optimum condition. When a person walks with a rapid footstep rate, the periodicity of his steps is apt to be more precise than when he is walking slowly. Conversely, when a person walks slowly he tends to take his steps with less uniform intervals between them so that the periodicity becomes less precise. In order to avoid enhancement of the Q of the filter system at the lower footstep rates, a second shift register is employed driven at a lower clock pulse rate, and this second register is connected only to the groups of gates which comprise those channels which are designed to sense the slower periodicities. Thus, the smaller intervals between footsteps occurring at the higher rates are divided into more parts by the higher clock rate; whereas, conversely, the longer intervals between footsteps occurring at the slower rates are divided into fewer parts by the use of the lower clock rate, whereby the Q of the over-all system is made greater in the former case and lesser in the latter case.

Still another important object of the invention is to eliminate false alarms attributable to a possible situation in which many events are picked up by the geophone at a rate of occurrence which is too high to represent footsteps. This might occur for instance, if the rate of occurrence were so high as to correspond roughly with every clock pulse, or with every second or every third clock pulse, etc., so that a very large number of events would be shifted along the stages of the respective shift registers, this situation naturally tending to enable the periodicity detecting gates of the various channels connected to the shift register stages. However, the initial filtering and threshold stages of the system operating prior to the digital filtering stages would not tend to eliminate such events providing their fundamental frequency components lay within the passband of the filer and providing that their pulse widths were at least 80 milliseconds in width, which might easily occur. In order to eliminate false alarms caused by such signals occurring at high rates, the system includes another group of wipe-out gates connected with the first few stages of the shift registers and operative to reset these stages when too many of them have responded in close succession to input events occurring too close together to be footsteps. These gates are connected to wipe out the burst of close-together events within the shift registers by resetting the first few stages in which the events were detected. The clock rate and the time constants in the amplifier system are so adjusted that discrete events which occur even closer together, such as might be attributable to the heel touching the ground followed almost immediately by the toe touching the ground during a normal footstep, would not trigger adjacent successive stages of the shift registers and therefore would not cause the above-mentioned resetting of the first few shift register stages which are sensitive only to events occurring slightly further apart in real time. Thus, the clock rate is such that it tends to group heel and toe events together so as to cause such related events to trigger the same stage of the shift register, whereas the wipe-out gates just discussed eliminate events which are further apart than the heel and toe events while at the same time eliminating events which occur at too high a rate to be attributable to individual footsteps.

Still another important object of the invention is to provide an event-rate detector system which is sensitive to the rate at which correlation of periodic events is occurring within the digital filter system as compared with the rate at which individual events are being signalled by the geophone. This rate detection means is designed to impose a criterion upon the system by which it can be determined that the incoming events are resulting in a fairly high rate of mutual correlation, and do not merely constitute a large number of events occurring in a thoroughly non-periodic manner, but nevertheless at such a rate as to place so many events in the shift registers that the stage sampling gates in the various channels are interpreting the events as being truly periodic when in fact they are merely overwhelming the system with sheer numbers. Since there are a large number of detection channels, each of which comprises a group of gates sensitive to the condition of regularly spaced shift register stages, a large number of input signals to the shift register might cause frequent outputs from the various channels, not because the inputs are really periodic in nature, but merely because there are so many of them. The outputs of these various channels, i.e., groups of gates, are connected through a single OR gate, and therefore the output of this OR gate could under some conditions signal alarms at a fairly high rate. The output of the OR gate is, however, according to the present improvement passed through a rate detector circuit wherein the rate at which the various signal channels are collectively signalling periodic intrusion events is compared with the rate at which event signal signature are being delivered by the geophone. An output is permitted from the rate detector circuit for the purpose of actuating the main intrusion alarm of the system only if the rate of event signatures coming from the geophone is not excessively high with respect to the rate at which the groups of gates are detecting periodicities. As a result of practical experience, a criterion has been set up in which, after a first periodicity has been signalled at the output of the OR gate indicating that periodicity is being detected in one of the groups of gates, then before two more similar outputs appear at the OR gate, there must be no more than seven events signalled from the geophone. In other words, within the time that three outputs appear at the OR gate, there must have been no more than seven events signalled by the geophone. This criterion requires, in other words, that most of the impulses picked up from the geophone must be successfully correlating with themselves because they are periodically related, and therefore false alarms are prevented which might be otherwise attributable to interspersed meaningless pulses arriving so rapidly as to make it appear to the digital filter that at least some of them result from events of truly periodic nature.

Figure 2:
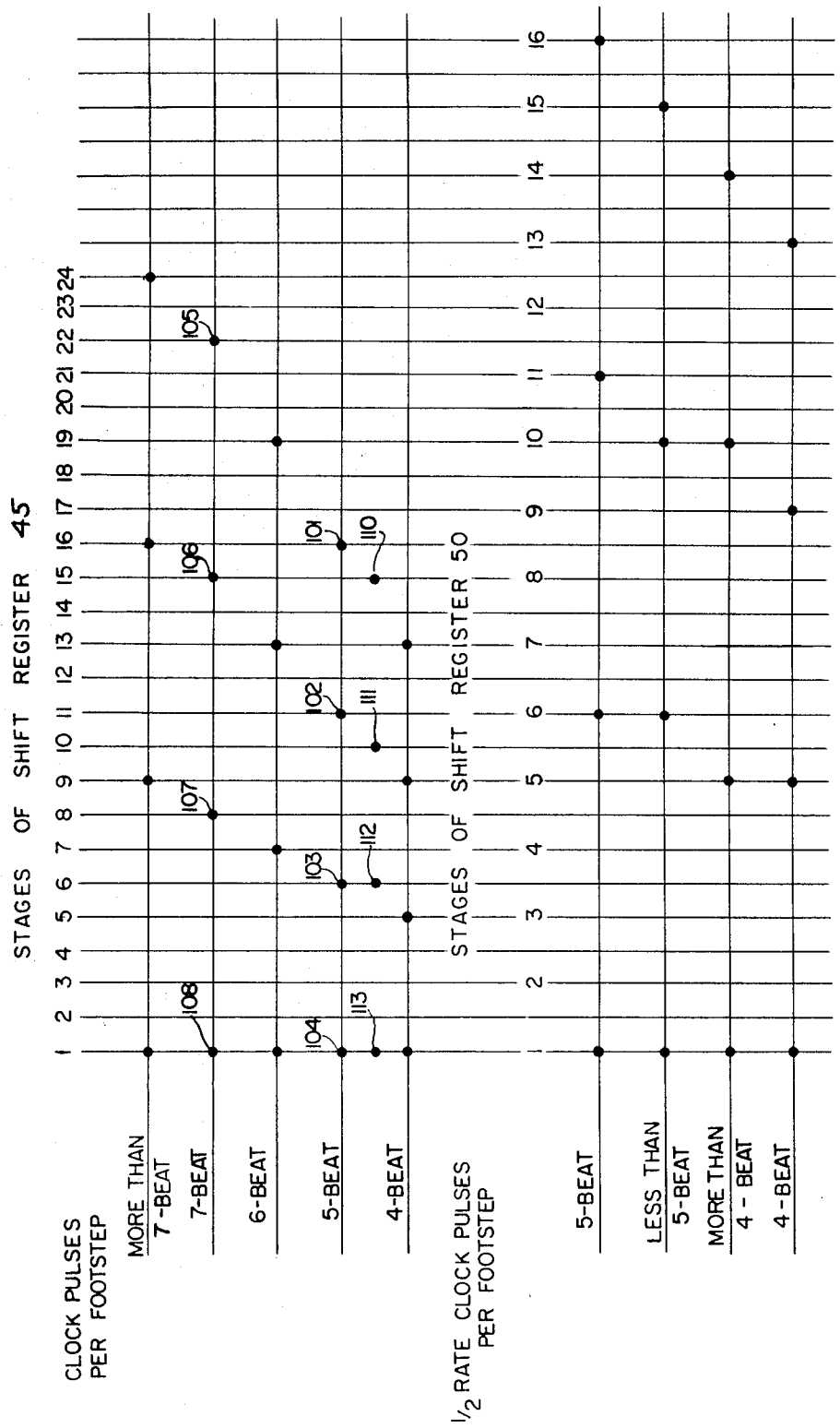

Other objects and advantages of the invention will become apparent during the following discussion of the drawings, wherein:

FIG. 1 is a block diagram showing a preferred embodiment of the present invention; and FIG. 2 is a diagram showing the distribution in real time of events which would result in the triggering of certain groups of gates to provide outputs in the various periodicity channels indicating the detection in those channels of periodically related events.

Referring now to the drawings, FIG. 1 shows a block diagram of a preferred embodiment of the invention wherein a geophone 30 picks up various vibrational events including both event signatures of interest and spurious event signatures. The geophone delivers the vibrational wavetrains into a preamplifier 31 where they are initially amplified and sent to an amplifier 32 which rectifies and returns part of the amplified signal to an AGC circuit 33 to adjust the gain in the preamplifier 31 in a manner which is frequently done in intrusion detector systems in order to increase their useful dynamic range. The amplified waveform envelope is then passed through a bandpass filter 34 which is provided with a relatively narrow pass characteristic designed to permit only frequency components of the greatest interest to pass therethrough. In one practical embodiment of the system being currently manufactured, the bandpass filter characteristic passes signals in the approximate frequency range from 1 through 6 Hertz, the lower cut-off frequency being set just above the DC range so that DC drift in the amplifiers and other very low frequency signatures will not affect the subsequent circuitry, and the upper roll-off of 6 Hertz being selected in order to eliminate components of the various waveform signatures which are unnecessary for the present detection system, for instance to eliminate signatures made by passing vehicles or by natural events, etc.

The filtered components leaving the bandpass filter 34 are then delivered to a threshold level detector 35 to which is also connected a source 36 of threshold voltage. The level of the voltage from the threshold source 36 can be adjusted, its output comprising a DC potential which serves as a threshold in the detector 35. The result is that all signals passing through the bandpass filter 34 and arriving at the level detector 35 are ignored by the level detector if their peak amplitudes do not exceed the level set by the threshold source 36. On the other hand, those components exceeding the threshold level are detected and are delivered as squared pulses from the level detector 35. Thus, signals of small amplitude can be removed from the input of the geophone, leaving as output only unidirectional pulses which represent events of significant magnitude as determined by adjustment of the threshold source 36 to an empirically determined level.

Events represented by signal components which are of sufficient amplitude to pass through the level detector 35 are then delivered to a minimum pulse-width detector 37. The purpose of this detector is to eliminate all of those signals whose pulse width is less than a predetermined duration. It has been observed that there are many phenomena which often occur with rather large amplitudes and which introduce spurious narrow pulses into the system. For example, movements of heavy equipment such as vehicles will tend to cause sharp peaks of brief duration. Conversely, the rectified components of footstep events tend to have pulse widths of greater duration, thus making it useful to provide means for discriminating against undesirable narrow pulse components which are not attributable to footstep events in favor of wider components which may represent events of interest. Therefore, the minimum pulse width detector 37 is introduced into the system for the purpose of eliminating those components whose pulse widths are less than an empirically selected 80 milliseconds while passing those components having a pulse width in excess of 80 milliseconds. The output of the minimum pulse width detector on wire 40 comprises those electrical event signals which have been accepted as to their pulse width, amplitude level, and frequency content; and all event signals appearing on wire 40 are then introduced into the subsequent filtering system which seeks to detect periodicity among them.

The digital filtering system comprises two main shift registers including a 24 stage shift register 45 and a 16 stage shift register 50. Both of these shift registers include input terminals connected to the wire 40 to receive the filtered event signals appearing thereon when such signals occur. The other input terminal to each of the shift registers 45 and 50 comprises a clock pulse terminal into which clock pulses are introduced in a manner well known per se, these pulses clocking the event signals sequentially along the shift registers through their various flipflop stages. These events are finally lost after they have reached the last stage of the shift register, both shift registers being of the end-off variety. It takes 24 shift, or 24 clock pulses, to pass the events through the register 45, whereas it takes 16 clock pulses to pass the events through the shift register 50 which has fewer stages. The clock pulses which drive the shift register 45 are generated in a clock pulse generator 43 which delivers clock pulses at the rate of 10.5 Hertz on the wire 44. These pulses clock the shift register 45 directly, but it will be noted that a divide-by-two circuit 48 is interposed between the clock generator 43 and the shift register 50. Therefore, the clock pulses appearing on the wire 49 to clock the shift register 50 occur at the rate of 5.25 Hertz so that the shift register 50 is driven at one half the rate of the shift register 45.

As a result, the event signals entering both shift registers on the wire 40 travel down the register 45 at twice the rate that they travel down the register 50, for the reasons to be discussed hereinafter in greater detail. The clock rate of 10.5 Hertz is selected so as to optimize the digital filtering taking into consideration the type of signals which are deemed of interest in this illustrative embodiment, namely footsteps. For present purposes walking rates are assumed to fall within the approximate range of one footstep per second to 2.5 footsteps per second, and therefore the generator clock rate falls somewhere within a range from about 4 to 11 times the normal footstep rate. Accordingly, if it were assumed that the clock rate were 10 times the rate at which footsteps are occurring at any particular moment, then the interval between the leading edge of each footstep signature envelop would be divided into 10 parts by the shift register. On the other hand, if the clock rate is, for example, only 4 times the footstep rate occurring at a particular moment, then the interval between leading edges of adjacent footstep events would be divided into 4 parts by the shift register. Thus, it can be seen that the rate of division of the interval between footsteps depends upon the rate of occurrence of the footsteps.

FIG. 2 is a diagram showing the spacings of footsteps occurring at various different rates along a horizontal scale representing real time. It should be noted that FIG. 2 is divided into two groups of showings, including an upper portion of the figure in which there are illustrated five different rates of footsteps, and a lower portion in which there are illustrated four different rates of footsteps, clocked at one half the rate of the upper portion. For instance, suppose that footsteps are occurring in the upper portion relatively rapidly, such that the interval of time between footsteps amounts to about 5 times the faster clock rate. The dots appearing on the various lines each represent the occurrence of a footstep event signal which has been clocked into the register 45. Looking at the five beat line in the upper group of FIG. 2, it will be seen that four footsteps have thus far been entered into the shaft register 45, the footstep 101 having entered the register first and having been clocked to the right so that it now appears as a signal in the 16th flipflop The footstep 102 occurred five clock pulses later and now appears in the 11th flipflop of the register 45, the next footstep event 103 appearing in the 6th register of the flipflop 105. Moreover, the most recent footstep 104 has just been entered into the first flipflop of the register 45, and therefore outputs appear in FIG. 1 on the wires 61, 66, 71 and 76 connected from the register 45 to the AND gate 85. As a consequence, the AND gate 85 is now enabled to all four of its inputs and delivers an output on wire 86. Thus, the filter has located in one of its channels a periodic correlation between four of the event signals arriving via wire 40. It does not matter that there might be other event signals appearing in stages of the shift register and enabling some of the other flipflop stages.

Another AND gate 87 is shown connected to four others of the shift register flipflop stages, this AND gate looking for periodicity among signals which occur at such a rate that they are related by every seven beats of the clock generator 43. Hence, the AND gate 87 is connected with the first flipflop output on wire 61, with the eighth flipflop output on wire 68, with the 15th flipflop**output on wire 75 and with the 22nd flip-flop output on wire 82. When events have been clocked into the flipflop for instance as shown by the dots 105, 106, 107 and 108 in FIG. 2, an output will appear on wire 88 from the AND gate 87 indicating that another periodicity has been found. By increasing the number of AND gate channels it will be noted that each one of the channels, like the AND gate channels 85 or 87, looks for a certain periodicity to occur among the events being clocked through the shift register 45, and when such periodic events occur the output of the system can indicate the determination of a periodicity. Hence, each AND gate represents a detection channel of very narrow bandwidth, namely a detection channel in which four periodic events must occur in a row without failure before an output can be indicated. The failure of any one of the events would result in failure of the corresponding AND gate to be enabled at all four of its inputs.

The present system actually employs more AND gates than would be expected at this point in the discussion, in view of the fact that any selected clock generator rate might possibly be a poor choice for a series of periodic events which might occur, for instance half way between the 5 beat clock rate as detectable by the AND gate 85 and a 6 beat rate which would be detectable by one of the other AND gates. Therefore, there is another series of AND gate channels represented typically by the AND gate 90, for instance, which connects with the first flipflop output on wire 61 and the sixth flipflop output on wire 66, but then instead of connecting to the 11th output on wire 71 the AND gate 90 connects with the 10th output on wire 70. Likewise, instead of connecting with the 16th flipflop on wire 76, it connects with the 15th flipflop on wire 75. Thus, the AND gate 90 is connected to a series of flipflops which are somewhat closer together than the 5 beat AND gate channel 85 so that in this case it will tend to detect signals occurring at a rate which is faster than the 5 beat rate and lies somewhere between it and the 4 beat rate shown on the diagram of FIG. 2. Admittedly, this is not a truly periodic connection when viewed geometrically, but nevertheless, recalling that these flip-flop stages remain conductive for finite times before they are clocked off again, the above described AND gate channel will be operative to pick up a series of footsteps occurring at about a four-and-two-thirds beat rate as indicated by the dots labelled 110, 111, 112 and 113 in FIG. 2. In a similar manner, other offbeat sampling channels similar to the gate 90 can be connected so as to pick-up and detect signals occurring at rates which are in between multiples or sub-multiples of the clock pulse rate of 10.5 Hertz. If 24 stages are used in shift register 45, then the slowest footstep rate which it could detect would be a seven-and-two thirds beat count shown on the top row in FIG. 2. This count rate represents another off-beat rate as compared with the clock rate of the generator 43. All event signals are clocked through both shift registers by the two clock pulse rates appearing on wires 44 and 49.

Looking at the diagram in the lower portion of FIG. 2 it will be seen that similar results could be obtained by placing an AND gate channel connected to flipflops 1, 5, 9, and 13 of the shift register 50, and that such an AND gate would provide outputs for the same periodicity rate as a gate connected to stages 1, 9, 17 and 25 in shift register 45, if it had 25 stages. However, a significant difference exists between an AND gate channel connected as an 8 beat channel in the shift register 45 and otherwise similar AND gate channel connected as a 4 beat channel in shift register 50, and this difference resides in the resulting Q of such a channel. The AND gate channel in the register 50 would have only half the Q of the AND gate channel connected to the register 45 because the flipflop stages to which it would be connected would remain energized twice as long because of the halved clock rate. Accordingly, the channel experiencing the halved clock rate would detect more off-bet periodicities which were not exactly 4 beat event spacings than would the higher Q filter system resulting from the 8 beat connection to the shift register 45. As pointed out at the beginning of this specification it is highly desirable that the Q of the system not be permitted to be increased for the purpose of detecting periodicities at the lower footstep rates, in view of the fact that the periodicity of a person's footsteps becomes less accurate as he walks more slowly. The showing in the lower portion of FIG. 2 illustrates a 5 beat channel referred to the halved clock pulse rate which channel is represented by the AND gate 91, the diagram of FIG. 2 also showing three additional channels including a 4 beat channel illustrated in the lowermost row of the diagram. Between these two channels are two more off-beat channels designed to pickup events occurring at rates which are not precisely related to the halved clock pulse rate on wire 49. The second row down in the lower portion of FIG. 2 shows an off-beat channel which has four inputs to a gate 92 which are respectively connected to the first and sixth stage flipflops of the register 50, but then the third input being connected to the 10th stage flipflop and the fourth input being connected to the 15th stage. Therefore, the overall effect is to pick-up footsteps occurring at a slightly faster rate than a 5-beat periodicity. On the other hand, the next to last row of dots in the lower part of FIG. 2 shows connections to still another off-beat AND gate channel which can be made to provide a detection channel for footsteps occurring at a rate slightly slower than a 4 beat rate.

The completeness of the coverage of possible periodicities is limited only by the expense to which the designer is willing to go in providing additional channels by connecting to the shift registers additional multiple input AND gates corresponding with the gates 85, 87, 90, 91, 92, . . . All of the outputs from all AND gate channels are connected through central OR gate circuitry 93 which delivers an output on wire 94 whenever any one of the AND gate channels finds periodicity by sampling the flipflop stages to which it is connected.

As mentioned above in the objects of the invention, it is possible for the system to receive event signals at such a high rate that an unduly high proportion of the flipflop stages in one or both of the registers will be rendered conductive, whereby the system will repeatedly find periodicity, not necessarily because periodicity actually exists, but rather because there have been so many input signals within a particular interval of time. This is the kind of thing that must be guarded against in view of the fact that the initial bandwidth filter, the pulse width detector and the amplitude level detector portions of the system are not capable of dealing with such a flood of pulses.

The present invention is therefore provided with means serving to reduce the tendency of a flood of pulses to overwhelm the digital filter system which might result in false indications of periodicity. It should be noted that the present system is seeking to detect footsteps, and it has been assumed that footsteps which this system is capable of detecting will not occur at a rate higher than about 2.5 footsteps per second. On the other hand, events are being clocked through the upper shift register 45 at the rate of 10.5 Hertz. Thus, footsteps should not occur at a rate in excess of one every 4 beats in the clock, and probably not that often. Therefore, two AND gates have been provided including the AND gate 41 connected to receive outputs from flipflop stages 1 and 4 of the shift register 45 and the AND gate 42 connected to sample the outputs of flipflop stages 1 and 3 of the shift register 45. These two AND gates have outputs which are fed into an OR gate 46 which delivers output on the wire 47 when-ever flipflop stage 1 is set at the same time either flipflop stage 3 or 4 is set. When this occurs, the system detects the occurrence in the gates 41 and 42, and the resulting output on wire 47 is used to reset the first 4 stages of both shift registers 45 and 50. Thus, signals occurring in very rapid mutual succession are prevented from travelling down the shift register chains, and are thereby wiped out from further consideration.

The present system is further provided with a rate sensitive detector 95. The rate detector receives all indications of detected periodicity on wire 94, but it also receives all of the individual event signals appearing on wire 40. The rate detector compares the rate at which pulses are received on the wire 40 with the rate at which periodicities are detected according to the output of the OR gate 93 on the wire 94. As soon as a first indication of periodicity occurs on wire 94, the rate detector begins examining the rate of input of additional event signals on wire 40. The criterion by which the rate detector operates is that there must not be more than 7 impulses indicating event signals on wire 40 before the next two indications of periodicity have occurred on the wire 94. This is a purely arbitrary criterion and tends to require that most of the input event signals are actually correlating with each other to indicate periodicity, i.e., that they represent truly periodic events rather than merely a large number of pulses of a spurious nature having little or no true periodicity, but overwhelming the system with sheer numbers. The rate detector can of course be made to employ any other desired criterion. However, if the incoming indications of periodicity on wire 94 pass the criterion imposed by the rate detector 95, they are then delivered as output on wire 96 to actuate a suitable system alarm 97. As a result, the system will warn of an intrusion by a truly periodic series of events.

As can be seen in FIG. 1, the rate detector 95 includes two counters 98 and 99, and a flipflop 100. The counter 98 receives indications of periodicity on wire 94 and is capable of counting three of them. The counter 99 receives event signals on wire 40 and is capable of counting seven of them. The flipflop 100 maintains the counters 98 and 99 cleared when it is reset, but not when it is set. The flipflop is set by a first periodicity signal on wire 94, which is also counted by the counter 98. At the same time the counter 99 is enabled to count event pulses arriving on wire 40. If two more periodicities occur and are counted by the counter 98 before the counter 99 has counted seven event pulses, the counter 98 outputs on wire 96 to actuate the alarm indicator 97. However, if random event pulses are occurring at too high a rate, the counter 99 will output first on wire 99a and reset the flipflop 100, thereby clearing both counters 98 and 99 to start over again. Moreover, the output of the wipe-out circuit from wire 47 is also connected to reset the flipflop 100 and clear the counters 98 and 99 whenever it clears the first four stages of the shift registers.

This invention is not to be limited to the illustrative example set forth above, for obviously changes may be made therein within the scope of the following claims.

We claim:

1. A system for detecting and indicating vibrational events of interest recurring at a periodic rate in the presence of other events occurring at random, comprising:
   a. means for picking up vibrations representing said events and converting them into electrical event signals;
   b. a source of clock pulses occurring at a rate in excess of the rate of occurrence of events of interest to which the system is intended to respond;
   c. multiple stage shift register means connected to receive said event signals, said source being connected to said register means to shift said event signals through its stages at the rate of said clock pulses;
   d. plural periodicity detecting channels each having an output and each having a group of AND gate means with multiple inputs respectively connected to periodically spaced stages of the shift register means, and each channel being operative to deliver an output signal when the stages to which the inputs of its AND gates are connected are simultaneously responding to correspondingly-spaced event signals; and
   e. means connected to the outputs of said channels and operative in response to an output signal appearing therein to indicate the detection of periodically related events.

2. In a system as set forth in claim 1, said shift register means comprising separate multiple-stage shift registers; the source of clock pulses including means for delivering clock pulses at different rates to each of said shift registers; and the channels whose AND gate inputs are connected to stages having the smallest spacings for the purpose of detecting events having the highest recurrence rates being coupled to the shift register which is driven by the source at the highest clock pulse rate, and the channels whose AND gate inputs are connected to stages having the greatest spacings for the purpose of detecting events having the lowest recurrence rates being coupled to the shift register which is driven by the source at the lowest clock pulse rate.

3. In a system as set forth in claim 1, the inputs of the AND gates in the groups which comprise the different channels being respectively connected to said stages with different spacings along the shift register means to detect event signals having different periodicities as they are shifted through the register means; and the various channels including channels whose AND gate inputs are all mutually spaced by exactly the same number of stages, and further including other channels whose AND gate inputs are mutually spaced by staggered numbers of stages, the latter channels being operative to detect periodic event signals whose periodicities are not closely related to the clock pulse rate.

4. In a system as set forth in claim 3, said shift register means comprising separate multiple-stage shift registers; the source of clock pulses including means for delivering clock pulses at different rates to each of said shift registers; and the channels whose AND gate inputs are connected to stages having the smallest spacings for the purpose of detecting events having the highest recurrence rates being coupled to the shift register which is driven by the source at the highest clock pulse rate, and the channels whose AND gate inputs are connected to stages having the greatest spacings for the purpose of detecting events having the lowest recurrence rates being coupled to the shift register which is driven by the source at the lowest clock pulse rate.

5. In a system as set forth in claim 3, the AND gate inputs in each channel including at least three inputs all connected to spaced ones of said stages and all of the inputs in any channel having to simultaneously detect an event signal in the stage to which it is connected before the channel can have a signal at its output.

6. In a system as set forth in claim 1, rate detector means for comparing the rate of arrival of electrical event signals with the rate of detection of periodically related event signals as indicated by output signals from said channels, said rate detector means being interposed between the outputs from the channels and the said means for indicating periodically related events, and the rate detector means having means operative to pass output signals to the indicating means when the rate of arrival of event signals is within a predetermined ratio with respect to the rate of said output signals whereby most of the event signals are periodically mutually related, and further having means operative to block said output signals to the indicating means when the rate of arrival of the event signals is outside of said ratio whereby many of the event signals are of random nature.

7. In a system as set forth in claim 1, means for wiping out from the stages of the register means electrical event signals occurring at a rate which is higher than the rate to which the system is intended to respond and which approaches or exceeds said clock pulse rate, comprising AND gates having inputs connected to the first few stages of the register means and operative to be enabled when several of said stages in close mutual proximity are simultaneously responding to event signals, and said gates having outputs each connected and operative when its gate is enabled to reset said first few stages of the register means.

8. In a system as set forth in claim 1, said means for picking up events and converting them into electrical signals comprising, a geophone; AGC amplifier means connected to said geophone to amplify its output; bandpass filter means connected to said amplifier means and having an AC passband restricted to pass only frequencies which are dominant in signatures of predetermined vibrational events of interest; and level detector means having an adjustable threshold level and operative to pass only electrical signals whose amplitudes exceeds said level.

9. In a system as set forth in claim 1, said events of interest comprising human footsteps having waveform signatures which when detected comprise a damped series of impulses, and said means for converting the events to electrical signals including minimum pulse width detector means operative to pass impulses whose widths exceed a preset minimum duration and to block impulses whose width is less than said minimum.

10. In a system as set forth in claim 9, said footstep events of interest occurring at rates approximately within the range of one to two-and-one-half events per second, and said shift register means comprising two shift registers, said source of clock pulses including means for delivering clock pulses at the rate of about 10.5 Hertz to one shift register and for delivering clock pulses at the rate of about 5.25 Hertz to the other shift register, and those of the channels which are operative to detect events having the highest recurrence rates having their AND gate inputs connected to said one shift register and the other channels which are operative to detect events having the lowest recurrence rates having their AND gate inputs connected to said other shift register.

11. In a system as set forth in claim 1, rate detector means for comparing the rate of arrival of electrical event signals with the rate of detection of periodically related event signals as indicated by output signals from said channels, said rate detector means being interposed between the outputs from the channels and the said means for indicating periodically related events, said rate detector means comprising a first counter connected to receive said channel output signals and operative to count a first number of them before delivering its own first output; a second counter connected to receive said electrical event signals and operative to count a second number of them, larger than said first number, before delivering its own second output; a flipflop connected to be set by each channel output signal and to be reset by each second output from the second counter, and the flipflop having an output in reset condition operative to clear both counters; and means connecting said first output to actuate said indicating means.

12. In a system as set forth in claim 11, means for wiping out from the stages of the register means electrical event signals occurring at a rate which is higher than the rate to which the system is intended to respond and which approaches or exceeds said clock pulse rate, comprising AND gates having inputs connected to the first few stages of the register means and operative to be enabled when several of said stages in close mutual proximity are simultaneously responding to event signals, and said gates having outputs each connected and operative when its gate is enabled to reset said first few stages of the register means and to reset the flipflop in the rate detector means.

* * * * *